United States Patent
Scholer

(10) Patent No.: US 12,355,912 B2
(45) Date of Patent: Jul. 8, 2025

(54) METHOD FOR DETECTING FRAUDULENT OR ABUSIVE USE OF A TELEPHONE SERVICE PROVIDED BY A TELEPHONE OPERATOR

(71) Applicant: ARAXXE, Lyons (FR)

(72) Inventor: Christophe Scholer, Villeurbane (FR)

(73) Assignee: ARAXXE, Lyons (FR)

( * ) Notice: Subject to any disclaimer, the term of this patent is extended or adjusted under 35 U.S.C. 154(b) by 364 days.

(21) Appl. No.: 17/910,185

(22) PCT Filed: Mar. 11, 2020

(86) PCT No.: PCT/FR2020/050502
§ 371 (c)(1),
(2) Date: Sep. 8, 2022

(87) PCT Pub. No.: WO2021/181012
PCT Pub. Date: Sep. 16, 2021

(65) Prior Publication Data
US 2023/0120157 A1   Apr. 20, 2023

(51) Int. Cl.
*H04M 15/00* (2024.01)

(52) U.S. Cl.
CPC ........... *H04M 15/47* (2013.01); *H04M 15/58* (2013.01); *H04M 15/8038* (2013.01)

(58) Field of Classification Search
None
See application file for complete search history.

(56) References Cited

U.S. PATENT DOCUMENTS

| | | | | |
|---|---|---|---|---|
| 9,729,727 B1* | 8/2017 | Zhang | ............... | H04M 15/56 |
| 2003/0063725 A1* | 4/2003 | Marchand | ............ | H04M 15/00 |
| | | | | 379/114.14 |
| 2013/0315386 A1* | 11/2013 | Stachiw | ............... | H04M 15/88 |
| | | | | 379/114.14 |
| 2016/0381545 A1* | 12/2016 | Wang | ................. | H04W 12/128 |
| | | | | 455/434 |
| 2018/0027415 A1* | 1/2018 | Powers | ................ | H04W 12/06 |
| | | | | 455/410 |

OTHER PUBLICATIONS

"GSMA Answers to BEREC Questions on RLAH"; Oct. 28, 2014.

* cited by examiner

*Primary Examiner* — Adolf Dsouza
(74) *Attorney, Agent, or Firm* — Nath, Goldberg & Meyer; Joshua B. Goldberg

(57) ABSTRACT

A method is provided where the method consists of collecting data on telephone communications carried out over a given study period pertaining to roaming and/or interconnection, creating data files for exchange data compilation for each studied number, reevaluating communications based upon pre-established reevaluation rules to obtain a wholesale cost amount for each studied number, identifying suspicious numbers based on wholesale costs exceeding a predetermined threshold value, and detecting fraudulent use by analysis of the compiled exchange data in the created files and/or multi-parametric indicators obtained from the data.

17 Claims, 3 Drawing Sheets

METHOD FOR DETECTING FRAUDULENT OR ABUSIVE USE OF A TELEPHONE SERVICE PROVIDED BY A TELEPHONE OPERATOR

This is a National Phase Application filed under 35 U.S.C. 371 as a national stage of PCT/FR2020/050502, filed Mar. 11, 2020, the content of which is hereby incorporated by reference in its entirety.

TECHNICAL FIELD

The present invention relates to the general technical field of telecommunications, and in particular telephone communications.

The present invention more particularly relates to the technical field of methods for detecting fraudulent or abusive use of at least one telephone service provided by a telephone operator, and that in the particular case of telephone communications involving a roaming and/or telephone network interconnection situation.

PRIOR ART

Telephone operators provide on a daily basis, to their own customers and to third-party telephone operators, a number of telephone services for carrying out telephone communications through one or several mobile and/or fixed telephone networks. In particular, the telephone services provided are intended to allow establishing and carrying out telephone communications involving a roaming and/or telephone network interconnection situation, on both national and international scale.

Telephone operators have been confronted for many years with fraudulent or at least abusive use of the telephone services they propose, by third parties who take advantage of certain breaches in the technical infrastructures or of advantageous financial conditions that may be associated with said telephone services to make trade-offs that generate for them a financial gain, or at least a financial saving, at the expense of the telephone operator. Such fraudulent or abusive uses are supported in particular by a continued development of offers proposing, at ultra-competitive rates, so-called illimited telephone communications, as well as an evolving regulatory framework imposing neutrality of the networks.

In this context, the telephone communications that implement mechanisms of international roaming and/or international interconnection between operators are particularly exposed to the risk of fraud and abuse, especially in view of the technical complexity inherent to the establishment of such telephone communications, of the multiplicity of actors involved (telephone operators, carriers, etc.) and of the diversity of associated retail and wholesale pricing policies. Moreover, to the complexity of the technical and financial agreements that may be concluded between telephone operators operating distinct telephone networks, is added the implementation of certain legislations and regulations concerning telephone communications pricing regulation (such as, for example, European regulation on roaming charges, called "Roam Like at Home" (RLaH)). These latter are liable to create phenomena of asymmetry between telephone operators, conducive to the development of fraudulent or abusive uses which can have a major impact on the telephone operators, both from an economic and technical point of view.

Given the very high volume of telephone communications carried out everyday, the existence of fraud or abuse cannot be effectively detected without the implementation of specific detection methods and technical means designed to process such quantities of telephone communications.

Thus, methods and technical means are known, which have been implemented in recent years by the telephone operators, to detect customer subscriptions that are used fraudulently or abusively at the expense of the telephone operator. These known methods and means are typically designed to detect frauds that consist, for third parties, in using telephone subscriptions of a telephone operator to circumvent the legitimate routing (or termination) of telephone communications for their benefit. As such, the known methods and means are typically designed to detect customer subscriptions of a telephone operator that are involved in a fraudulent circumvention scheme, by analysing the traffic data relating to telephone communications made by the customers of the telephone operator and a comparison with well-defined typical profiles.

Such known methods and means nevertheless suffer from a number of major limitations and drawbacks. Firstly, they generally do not allow detecting fraudulent or abusive use of telephone services of a telephone operator, that would be made using a telephone subscription of another telephone operator. Moreover, they generally offer limited capabilities in terms of typology of frauds and abuses liable to be effectively detected using them, in particular due to the fact that they are essentially based on techniques of recognition of known typical profiles. Now, the fraudulent users redouble their ingenuity to escape detection by such known detection methods and means by limiting their traffic volumes under detection thresholds or by creating new schemes of fraudulent or abusive use particularly penalizing for the telephone operators.

DISCLOSURE OF THE INVENTION

The objects assigned to the present invention therefore aim to remedy all or part of the above-mentioned drawbacks, and to propose a new technical method for detecting fraudulent or abusive use of telephone services, that makes it possible to detect in a particularly efficient manner fraudulent or abusive use of telephone services.

Another object of the invention aims to propose a new method for detecting fraudulent or abusive use that cannot be easily counter-detected and avoided by fraudulent or abusive third parties.

Another object of the invention aims to propose a new method for detecting fraudulent or abusive use that is particularly reliable and robust, with a reduced risk of detecting false-positives.

Another object of the invention aims to propose a new method for detecting fraudulent or abusive use that, while being particularly efficient, is nevertheless particularly simple and fast to implement.

The objects assigned to the invention are achieved by means of a method for detecting fraudulent or abusive use of at least one telephone service provided by a telephone operator, said method comprising the following successive steps:

a step E1 of collecting, by a first collection module, transaction data relating to a plurality of telephone communications made, over at least one portion of a given study period, from or towards telephone numbers, called the studied numbers, said plurality of telephone communications comprising at least telephone communications that involve a roaming and/or interconnection situation;

a step E2 of computer processing of said transaction data and constructing, for each studied number, an individual sheet compiling collected transaction data that correspond to said number studied over said portion of a study period;

a step E3 of revaluing telephone communications among said plurality of telephone communications, by a first revaluation module, on the basis of pre-established wholesale cost revaluation rules, to obtain for each of said studied numbers a wholesale cost amount incurred by the telephone operator over said portion of study period;

said method then comprising:

a step E4 of identifying, by a first identification module, studied numbers called suspect numbers for which, over said portion of study period, said wholesale cost amount is higher than a first predetermined threshold value;

and/or a step E5 of calculating, by a calculation module, for each of said studied numbers or said suspect numbers, a revenue amount generated for the benefit of the telephone operator over said portion of study period, said step E5 being followed by a step E6 of identifying, by a second identification module, studied numbers or suspect numbers for which, over said portion of study period, said wholesale cost amount being higher than said revenue amount;

said method comprising, after step E4 or after step E6, a step E7 of detecting a fraudulent or abusive use by analysing, by an analysis module, transaction data compiled in said individual sheets associated with said identified numbers and/or multiparametric indicators constructed from transaction data complied in said individual sheets associated with said identified numbers.

BRIEF DESCRIPTION OF THE DRAWINGS

Other features and advantages of the invention will appear in more detail upon reading of the following description, with reference to the appended drawings, given by way of purely illustrative and non-limiting examples, in which.

WAYS TO IMPLEMENT THE INVENTION

Figure 1:
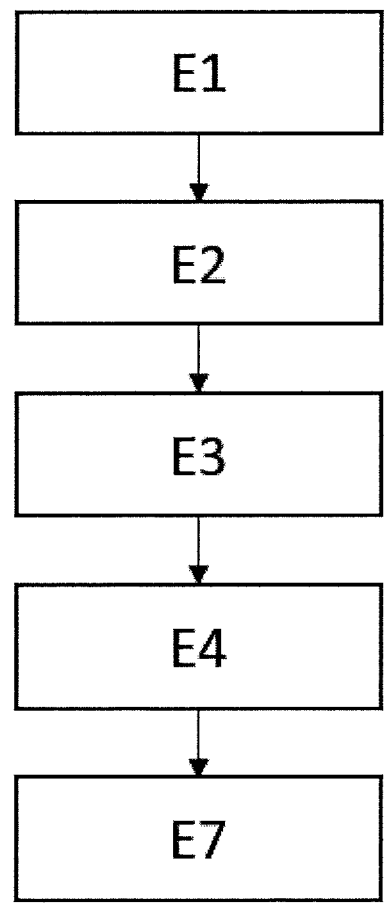
FIG. 1 schematically illustrates a variant of a detection method according to the invention.

The invention relates to a method for detecting a fraudulent or abusive use of at least one telephone service provided by a telephone operator, or at least, for detecting an abnormal, unexpected use of such a telephone service, which is liable to cover a fraud or an abuse by a third party against said telephone operator. Here, it is advantageously understood by "fraudulent or abusive use" a misuse, improper or unexpected use of at least one telephone service provided by the telephone operator, said use generally aiming at the generation of a financial gain, or at least a financial saving, for the benefit of a fraudulent user or an abusive user. Such a fraudulent or abusive use is liable, if not intended, to have a negative economic and/or technical impact on said telephone operator.

The telephone service(s) liable to be concerned by the method according to the invention may be, for example, technical services providing a customer (subscriber) of the telephone operator with a telephone number and a SIM ("Subscriber Identity Module") card, as well as associated technical services for allowing in particular said customer to access a telephone network operated by said telephone operator and to use said network to make telephone communications (emission/reception of "voice" calls, messages of the SMS/SMS+ or MMS/MMS+ type, data, etc.), in connection with a telephone subscription or with a pre- or post-paid access offer subscribed by the said customer with said telephone operator. Moreover, they may be telephone services allowing the customer of the telephone operator to make, using a telephone number and a SIM card made available to him/her by the telephone operator, telephone communications in a situation of roaming on a telephone network of a third-party telephone operator.

Moreover, said telephone services may also be, for example, technical services of "providing" a third-party telephone operator with a telephone network operated by said telephone operator, typically in the context of roaming and/or interconnection agreements, as well as associated technical services for allowing a customer of said third-party telephone operator to access a telephone network operated by said telephone operator and to use said network to make telephone communications (emission/reception of "voice" calls, messages of the SMS/SMS+ or MMS/MMS+ type, data, etc.), in roaming and/or interconnection situation. In this case, the customer of the third-party telephone operator, although not a customer of said telephone operator and using in the first place telephone services that are provided to him/her by the third-party telephone operator with which the customer has taken out a subscription or a post/pre-paid offer, nevertheless uses indirectly one or several telephone services of said telephone operator when, for example, said customer is received in roaming situation on a telephone network of said telephone operator or when said customer make a telephone communication that is routed, terminated, via the telephone network of said telephone operator.

The detection method according to the invention advantageously aims, in particular, to detect frauds or abuses that could typically be due to:

a customer of the telephone operator, who has subscribed to a service offer from the telephone operator, and who uses in this context at least one service of the telephone operator from a telephone number managed by the telephone operator and connected either directly to a telephone network of the telephone operator or to a telephone network of a third-party telephone operator in roaming situation; and/or a customer of a third-party telephone operator, who uses at least one service of the telephone operator allowing him/her to connect to a telephone network of the latter (as a visited network) and to make telephone communications in roaming situation.

In particular, some customers are liable to use a telephone service so provided by the telephone operator for the sole purpose of taking advantage of favourable financial conditions associated with a particular offer of service(s), for example for certain call destination countries, for certain telephone communication formats, etc., in order to make fraudulent, or at least abusive, operations and for example to:

exploit a telephone communication traffic resale (implementation of "SIM box" systems for resale of Voice-format international telephone communication traffic or resale of SMS-format telephone communication traffic in Application-to-Person (A2P) mode, for example), generate traffic inflation (artificial traffic) of telephone communications to their benefit, call premium-rate call numbers with the aim of capturing a share of the termination charges associated with the telephone communications thus generated, etc.

They may also be individual customers who, although not having for first intention to fraud, however use abusively a telephone service provide by the telephone operator with which they have subscribed a service offer, and that sometimes despite the establishment by the telephone operator of "Fair Usage Policy", or FUP.

The method according to the invention may typically be implemented by the telephone operator itself, or by a third-party actor mandated for that purpose by said telephone operator. The implementation of such a detection method advantageously aims—once a fraud or an abuse detected using said method—to allow the implementation, as the case may be, of corrective and/or preventive actions in such a way as to strongly limit, or even fully forbid, the continuation or the reproduction of such a fraudulent or abusive use. As will be contemplated hereinafter, the method according to the invention may possibly comprise one or several steps aiming to implement such corrective and/or preventive actions.

Figure 2:
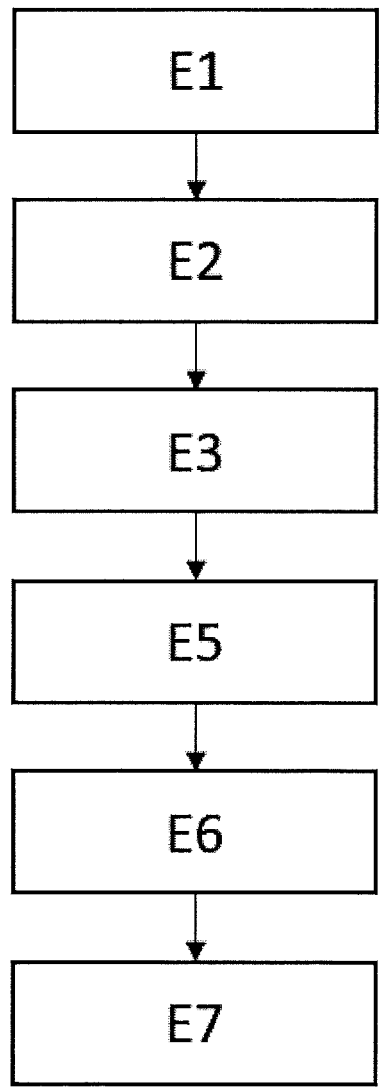
FIG. 2 schematically illustrates another variant of a detection method according to the invention.
Figure 3:
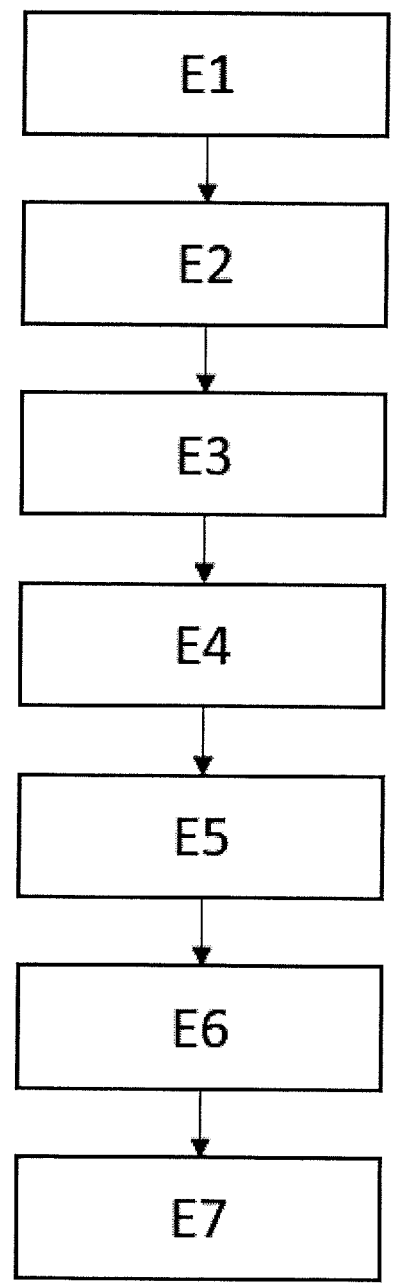
FIG. 3 schematically illustrates still another variant of a detection method according to the invention.

Generally, the detection method according to the invention, schematically illustrated in FIGS. 1 to 3, comprises a plurality of successive steps among which at least:

a step E1 of collecting, by a first collection module, transaction data relating to a plurality of telephone communications made, over at least one portion of a given study period, from or towards telephone numbers, called the studied numbers, said plurality of telephone communications comprising at least telephone communications that involve a roaming and/or interconnection situation;

a step E2 of computer processing of said transaction data and constructing, for each studied number, an individual sheet compiling collected transaction data that correspond to said number studied over said portion of a study period;

a step E3 of revaluing telephone communications among said plurality of telephone communications, by a first revaluation module, on the basis of pre-established wholesale cost revaluation rules, to obtain for each of said studied numbers a wholesale cost amount incurred by the operator over said portion of study period.

The method then comprises:

a step E4 of identifying, by a first identification module, studied numbers called suspect numbers for which, over said portion of study period, said wholesale cost amount is higher than a first predetermined threshold value;

and/or a step E5 of calculating, by a calculation module, for each of said studied numbers or said suspect numbers, a revenue amount generated for the benefit of the telephone operator over said portion of study period, said step E5 being followed by a step E6 of identifying, by a second identification module, studied numbers or suspect numbers for which, over said portion of study period, said wholesale cost amount being higher than said revenue amount.

Moreover, the method according to the invention also comprises, after step E4 or after step E6, according to the alternative retained, a step E7 of detecting a fraudulent or abusive use by analysing, by an analysis module, transaction data compiled in said individual sheets associated with said identified numbers and/or multiparametric indicators constructed from transaction data complied in said individual sheets associated with said identified numbers.

Thus, in a very unique way, the invention implements in particular the clever combination of:

technical operations of collecting and individualizing, for each telephone number studied, transaction data characterizing telephone communications made using at least one telephone service provided by the telephone operator, and technical operations of revaluing the telephone communications, the transaction data of which have been collected and individualized, and of identifying telephone numbers showing a particular economic anomaly. These operations aim to target the detection of fraud and abuse on studied telephone numbers that, taking into account the existence of such an anomaly, have a very strong probability of fraud or abuse.

According to a variant (hereinafter referred to as Variant A), schematically illustrated in FIG. 1, the detection method according to the invention may comprise the above-mentioned steps E1, E2, E3, E4 and E7, steps E5 and E6 being omitted. In other words, the detection of fraud or abuse is then focused on telephone numbers for which an anomaly in terms of wholesale costs has been identified. Such an approach is particularly pertinent insofar as, whatever the modus operandi of telephone frauds and abuses, these latter are precisely likely to generate abnormally high wholesale costs for the telephone operator.

According to another variant (hereinafter referred to as Variant B), schematically illustrated in FIG. 2, the detection method according to the invention may comprise steps E1, E2, E3, E5, E6 and E7, step E4 being omitted. The detection of fraud or abuse is then focused to telephone numbers for which a "gross margin" anomaly was identified, that is to say on telephone numbers for which a negative difference between revenues and wholesale costs was identified. Such an approach is particularly interesting insofar as, whatever the modus operandi of telephone frauds and abuses, these latter are likely to generate wholesale costs for a given telephone operator that, although not being abnormally high as such, nevertheless remain higher than the revenues generated for the benefit of the operator for this same telephone number.

According to still another variant (hereinafter referred to as Variant C), schematically illustrated in FIG. 3, the detection method according to the invention may comprise all steps E1 to E7, listed hereinabove. In this case, the studied numbers concerned by steps E5 and E6 are then advantageously telephone numbers that have been previously identified as suspect based on a cost anomaly criterion at the end of step E4. Such a variant C of the method according to the invention thus advantageously implements an identification in cascade of economical anomalies in terms of costs and "gross margin".

The method according to the invention advantageously makes it possible to detect more rapidly and more efficiently known frauds or abuses, but also to detect particularly efficiently frauds or abuses that were previously undetectable by the known detection methods, insofar as these latter.

do not consider such a logic of individualisation of the telephone communications per studied number, and are not interested at all in the existence of economic anomalies (and are in no way technically capable of detecting such economic anomalies), which are nevertheless highly likely to indicate the existence of a fraud or an abuse in the telephone communications.

Moreover, it is to be noted that, due in particular to the fact that it implements a technical identification of economic anomalies, the method according to the invention is particularly insensitive to the implementation, by fraudulent or abusive users, of counter-detection and avoidance techniques.

The method according to the invention and the different steps generally introduced hereinabove will now be described in more detail.

As introduced hereinabove, step E1 of the method according to the invention aims to extract, import, collect transaction data relating to telephone communications that are made over at least a portion of a predefined (time) study period, from or towards telephone numbers (studied numbers), hence using at least one telephone service of said telephone operator.

Said portion of given study period and the extent thereof may advantageously be defined according to
- the quantity of telephone transaction data involved, and/or
- a typical duration of the frauds or abuses that are to be preferentially detected: certain frauds may be made over very short time intervals, for example during religious holidays or sporting events that generate a lot of telephone traffic, within which fraudulent users can hide more easily their operations, whereas other frauds can on the contrary be characterized by relatively long operating times, and/or
- a periodicity of generation and availability of CDR, EDR and/or TAP files, containing transaction data, and/or
- a periodicity of telephone service provision by the telephone operator, or according to any other relevant additional or alternative criterion.

Said study period may comprise a single portion of study period, or a plurality of portions of study period, consecutive or not, continuous or discontinuous. The study portion(s) may for example correspond to a particular time slot of a given day, a time range extending over one or several days, over one or several weeks, etc. Possibly, they may be consecutive portions of study period that are advantageously of same duration. For example, the study period may be of six month and comprise six consecutive portions of study period, of one month each.

As known as such, said transaction data are data that characterize telephone communications the making of which has required the implementation of a certain number of technical operations to allow their establishment, their routing. Typically, such transaction data may comprise a caller's telephone number (emitter number), a called party's telephone number (receiver number), time-stamp information about a telephone communication, information about a country of origin (emission) of a telephone communication, information about a country of destination (reception) of a telephone communication, information about a number of telephone communications of a given format, information about a telephone communication duration, information about a volume of data exchanged during a telephone communication, information about a roaming situation (country, date, etc.) of a calling or called telephone number, an IMEI ("International Mobile Equipment Identity") number, etc.

In particular, the transaction data collected during step E1 comprise at least transaction data relating to telephone communications involving a roaming and/or interconnection situation (or so-called exogenous-component telephone communications), that is to say transaction data relating to telephone communications that, because they implement roaming and/or inter-operator interconnection mechanisms, have required for their establishment and their making, the use of at least one telephone service provided by the telephone operator and at least another telephone service provided by a third-party telephone operator. Such exogenous-component telephone communications generate, in a manner known as such, wholesale costs for the telephone operator, which are charged to the latter by partners or technical service providers or by one or more third-party telephone operators, in the context of roaming agreements (Roaming inter-operator tariff ("IOT") agreements) and/or interconnection agreements (Inter-operator interconnection, termination or carrier tariff agreements).

More precisely, such transaction data relating to exogenous-component telephone communications are liable to be generated in particular in the following situations:
- in the case of a telephone communication made by at least one customer of the telephone operator, said customer being connected to a telephone network (home network) operated by the telephone operator, said telephone communication requiring the establishment of at least one interconnection to a telephone network of a third-party telephone operator;
- in the case of a telephone communication made in roaming situation, by at least one customer of the telephone operator, said customer being connected to a telephone network (visited network) of a third-party telephone operator (outbound roaming);
- in the case of a telephone communication made in roaming situation, by at least one customer of a third-party telephone operator, said customer being connected to a telephone network (home network) of the telephone operator (inbound roaming).

As a reminder, roaming is the possibility offered to a customer of a telephone operator to emit and/or receive, from or towards his/her telephone number, at least one telephone communication through a telephone network to which it is connected and that is operated by a third-party telephone operator with respect to the telephone operator of said customer. A roaming situation can exist both at the national and international level. As also known, interconnection relates to the connection between telephone networks of a plurality of telephone operators to allow a customer of one of these telephone operators to make a telephone communication towards a telephone number generated by another telephone operator and connected to a third-party telephone network. An interconnection situation can exist both at the national and international level.

Possibly, during step E1 can also be collected transaction data relating to only endogenous-component telephone communications, that is to say relating to telephone communications that have been made using exclusively one or several telephone services provided by the telephone operator and one or several telephone networks operated by said telephone operator (typically, telephone communications made between two customers of the telephone operator, both connected to a telephone network of the telephone operator).

According to a variant, during step E1 the integrality of the transaction data relating to the telephone communications made, during said portion of study period, using at least one telephone service provided by the telephone operator, is collected.

However, according to the duration chosen for the study period portion, the volume of corresponding telephone transaction data can be extremely high, so that the collection and later processing of these latter would be particularly long and complex and could require the implementation of particularly expensive technical collection and processing means.

Therefore, insofar as in particular such only endogenous-component telephone communications are not usually liable to generate wholesale costs for the telephone operator, it is advantageous to provide that the transaction data intended to be compiled in the individual sheets during step E2 are transaction data relating to only telephone communications involving an itinerance and/or interconnection situation (only exogeneous-component telephone communications).

As such, the detection method can comprise, according to a variant, an operation of selecting (or filtering) transaction data collected during step E1, in such a way as to discard potential transaction data relating to only endogenous-component telephone communications that could have been collected, and to thus keep, for executing the following steps of the method, only transaction data relating to telephone communications involving a roaming and/or interconnection situation. According to another variant, it may be contemplated that collection step E1 is provided to collect only such transaction data relating to a roaming and/or interconnection situation. For example, said first collection module could in this case be advantageously configured to collect, during said step E1, only such transaction data relating to a roaming and/or interconnection situation, among a greater set of available transaction data.

Still more advantageously, the transaction data intended to be compiled in the individual sheets during step E2 are transaction data relating to only telephone communications involving an international roaming and/or international interconnection situation. Indeed, taking into account their technical complexity of implementation and monitoring, the multiplicity of actors involved and the diversity of associated tariff policies, the telephone communications involving an international roaming and/or international interconnection situation are more particularly exposed to significant risks of fraud and abuse for the telephone operator. It is therefore particularly relevant and effective in practice to analyse more specifically such international-component telephone communications.

As such, said method can comprise, according to a variant, an operation of selecting (or filtering) the collected transaction data, in such a way as to discard potential transaction data relating to telephone communications that do not involve an international roaming and/or international interconnection situation, and to thus keep, for executing the following steps of the method, only transaction data relating to telephone communications involving an international roaming and/or international interconnection situation. According to another variant, it may be contemplated that said collection step E1 is provided to collect only such transaction data relating to an international roaming and/or international interconnection situation. For example, said first collection module could in this case be advantageously configured to collect, during said step E1, only such transaction data relating to an international roaming and/or an international interconnection situation, among a greater set of available transaction data.

In this particular case, the transaction data that will then be processed during step E2 thus advantageously belong to either one of the three following groups:

- telephone transaction data relating to at least one international telephone communication made, by at least one customer of the telephone operator, from a telephone network operated by the telephone operator and to which is connected said customer, and involving the establishment of at least one international interconnection. They may be in particular transaction data that characterize at least one telephone communication emitted by at least one customer of the telephone operator from at least one telephone number managed by said telephone operator, from a telephone network (or home network) of the latter to which the customer is connected, and towards at least one telephone number managed by a foreign third-party telephone operator (that is to say that does not operate in the same country as said telephone operator) and reachable by means of a foreign third-party telephone network of said foreign third-party telephone operator;
- telephone transaction data relating to at least one telephone communication made in a roaming situation from abroad, by at least one customer of the telephone operator, using a foreign third-party telephone network operated by a foreign third-party telephone operator and to which is connected said customer. They can hence be in particular telephone transaction data that characterize at least one telephone communication emitted (or received) by at least one customer of the telephone operator from (or towards) at least one telephone number managed by the telephone operator, said customer being in roaming situation abroad in such a way that said telephone communication is emitted from (or received on) a foreign third-party telephone network (visited network) operated by a foreign third-party telephone operator (telephone communication said in outbound roaming situation);
- telephone transaction data relating to at least one telephone communication made in a roaming situation, by at least one customer of a foreign third-party telephone operator, using a telephone network operated by the telephone operator and to which is connected said customer. They can thus be in particular transaction data that characterize at least one telephone communication emitted (or received) by at least one customer of a foreign third-party telephone operator from (or towards) at least one telephone number managed by said foreign third-party telephone operator, said customer being connected in roaming situation to a telephone network (visited network) of the telephone network, from which is emitted (on which is received) said telephone communication.

Even so, according to the nature of the telephone service(s) provided by the telephone operator and/or according to the fraudulent or abusive uses that are to be preferentially detected, it is also conceivable to provide that the transaction data intended to be compiled in said individual sheets during step E2 are transaction data relating to only telephone communications involving a roaming situation, whether the latter is national or international, and/or an international interconnection situation. Nor can it be excluded that the transaction data intended to be compiled during step E2 are transaction data relating to only telephone communications relating to only telephone communications involving an international roaming situation and/or an interconnection situation, whether the latter is national or international.

Advantageously, said transaction data collected during step E1 are contained in Call Detail Record (CDR) files, and/or Event Detail Record (EDR) files, and/or in transaction files relating to a roaming situation at the TAP (Transferred Account Procedures) format, wherein said TAP format can be of any known version, and for example of TAP1, TAP2, TAP2+ or also TAP3 version. They may be so-called "TAP-IN" files or "TAP-OUT" files, according to whether they relates to inbound or outbound roaming situations. Such CDR/EDR and TAP files, which are generated by the different actors and technical equipment involved in the establishment and the making of telephone communications for charging purposes, are well known as such and are based on international telecommunications industry standards, so that it is not necessary to describe them in more detail here.

The first collection module implemented for the making of step E1 can thus be configured to read, extract and collect transaction data contained in in Call Detail Record files (called CDR files and/or EDR files), and/or in transaction files made in a roaming situation (called TAP-IN and/or TAP-OUT files). As an alternative, said first collection module can be configured to collect said call detail record files and/or said transaction files relating to a roaming situation in the TAP format, as such, and to then extract the transaction data contained in these files.

Advantageously, said transaction data intended to be compiled in said individual sheets during step E2 are related to telephone communications in Voice format, SMS and/or SMS+ and/or MMS and/or MMS+ format(s), and/or Data format. In other words, according to the nature of the telephone service(s) provided by the telephone operator and/or according to the fraudulent or abusive uses that are to be preferentially detected, said collected transaction data may be limited to transaction data relating to only telephone communications in Voice format, relating to only telephone communications of the message type in SMS ("Short Message Service"), SMS+ ("premium Short Message Service"), MMS ("Multimedia Message Service") and/or MMS+ ("premium Multimedia Message Service") format(s), relating to only telephone communications in Data format, or relating to telephone communications according to several different formats among those listed hereinabove. For example, said transaction data compiled in the individual sheets during step E2 may concern only telephone communications in Voice format, on the one hand, and telephone communications in SMS/SMS+/MMS/MMS+ format, on the other hand.

As such, the detection method may possibly comprise an operation of selecting (or filtering) transaction data collected during step 1 in order to keep, for executing the following steps of said method, only transaction data relating to telephone communications in the format(s) chosen among the above-mentioned Voice, SMS/SMS+/MMS/MMS+ and Data formats. As an alternative, step E1 could be made in such a way as to collect during the latter only transaction data relating to telephone communications in the format(s) chosen among the above-mentioned Voice, SMS/SMS+/MMS/MMS+ and Data formats.

Typically, in the case where the method according to the invention is implemented by a third-party actor mandated by the telephone operator, as contemplated hereinabove, the collection step E1 can implement the establishment of a remote computer connection, for example via Internet, to one or several databases of said telephone operator, and the downloading by said first collection module, advantageously implemented within a computer infrastructure of the mandated third-party actor, of transaction data contained in said database(s) of said telephone operator.

The transaction data so collected during step 1 and/or selected after collection are advantageously memorized in at least one database. In order in particular to make easier the handling and processing of said transaction data, said database in question is preferably managed by a document-oriented database management system, that can possibly be distributed over any number of computers and that advantageously does not require a predefined data scheme (such as, for example, a database MongoDB®).

Moreover, the just-described step E1 may possibly comprise a number of additional technical operations aiming to improve the efficiency, rapidity and/or reliability, as for example:
- one or several operations of validating (number, redundancy, integrity, etc.), by at least one validation module, the transaction data collected and/or selected after collection, and/or
- one or several operations of reprocessing, by at least one reprocessing module, the transaction data collected and/or selected after collection, and/or CDR, EDR and/or TAP (TAP IN and/or TAP OUT) files in which said transaction data can be contained, including for example a conversion into national/international telephone number format, an aggregation of transaction data relating to a plurality of different formats of telephone communications (Voice, SMS/SMS+/MMS/MMS+, Data formats, etc.), possibly over different sub-periods and/or from a plurality of sources (databases, etc.) of transaction data.

During the previously introduced step E2, transaction data collected during step 1 and/or selected after collection during step 1 are then processed in a computerized, and advantageously automated, manner, and an individual sheet (or matrix) is constructed for each of said studied numbers. Advantageously also computerized, each of said individual sheets compiles, aggregates, collected transaction data corresponding to a studied number over a study period, in such a way as to advantageously create an individual usage summary sheet.

Said step E2 may advantageously be implemented using a data compilation/aggregation module and an individual sheet construction module, connected to said data compilation/aggregation module. Advantageously, the method can comprise an operation of memorizing so-constructed individual sheets, for example in an individual sheet database or in the form of as many separate computer files.

Step E3 of the detection method according to the invention then aims to obtain, calculate, for each of said studied numbers (and thus for each of said associated individual sheets) a wholesale cost amount incurred by the operator over the considered portion of study period or, at least, a score or indicator representative of such a wholesale cost amount. It is understood here by "telephone communications revaluation" the calculation of an amount (or a score or indicator representative of an amount) of wholesale costs incurred (or at least liable to be incurred) by the operator over at least said portion of study period, for establishing and making telephone communications, the corresponding transaction data of which have been collected, possibly selected, then compiled, aggregated, in an individual sheet associated with a given studied number.

For that purpose, the telephone communications corresponding to the transaction data collected, and possibly selected, then compiled, aggregated, in each of the individual sheets are revalued, advantageously automatically, by said first revaluation module, on the basis of pre-established wholesale cost revaluation rules. As such, said first revaluation module can be connected, for example, on the one hand to at least one database in which are memorized said pre-established wholesale cost revaluation rules and, on the other hand, to the database in which are advantageously memorized said individually sheets. At the end of step E3, a wholesale cost amount (or a score or amount indicator) is thus allocated to each of said studied numbers, and thus to each of the corresponding individual sheets. Advantageously, each telephone communication is unitarily revalued during step E3, in such a way as to obtain a corresponding wholesale cost by telephone communication, then the total wholesale cost amount per studied number is obtained by summing the wholesale costs of each of the telephone communications made by said studied number. Possibly, said wholesale cost amount (or said score or said amount indicator) can then be reported in the corresponding individual sheet. It is also possible to provide that, in addition to said total wholesale cost amount so calculated, the wholesale costs calculated unitarily for each of the telephone communications are also reported in the corresponding individual sheet.

Preferentially, said pre-established wholesale cost revaluation rules are based wholly or in part, and even preferably exclusively, on estimated wholesale tariffs. Indeed, taking into account in particular the multiplicity of wholesale tariff agreements possibly applicable (and thus the different tariff documents and/or databases that should be taken into consideration), their high variability based on multiples criteria (such as, for example, the networks of origin and/or destination of the communications, the carrier(s) involved, the charging pitch considered, or also as a function of the changes in currency exchange rates), and their often highly confidential nature, it may sometimes be tricky to construct and apply wholesale cost revaluation rules that are exclusively based on real wholesale tariffs. Therefore, the implementation of estimations for constructing pre-established wholesale cost revaluation rules advantageously makes it possible to considerably simplify and accelerate the implementation of the method. Still more advantageously, said pre-established wholesale cost revaluation rules are based wholly or in part on estimated wholesale tariffs, to which is applied an uprating safety coefficient, in such a way that the so-calculated wholesale cost amount incurred by the telephone operator over said portion of study period is voluntarily overestimated.

Once a wholesale cost amount obtained at the end of step E3 for each of said studied number, step E4 of the detection method according to the invention thus aims to identify, among said studied numbers, that or those for which said corresponding wholesale cost amount is higher than a first predetermined threshold value (predetermined cost threshold value). The so-identified studied numbers are thus qualified as suspect. Advantageously, said first identification module is as such configured to automatically compare one by one the wholesale cost amounts (or scores or amount indicators) obtained at the end of step E3 with said first predetermined threshold value.

Said first predetermined threshold value is advantageously defined as being representative of a wholesale cost amount (or a value of a score or an indicator representative of a wholesale cost amount) that the telephone operator estimates being able to usually support, in connection with the telephone service(s) provided, over said portion of study period. By way of non-limiting example, said first predetermined threshold value may be chosen as a function of an average revenue per user (ARPU) generated in the past for a period similar to said considered portion of study period. The individual sheets that correspond to studied numbers so identified as suspect at the end of step E4 can then, for example, be extracted and memorized in a database of suspect individual sheets, or be allocated with a particular identifier or marker.

After or instead of said step E4 (according to the retained variant B or C), the detection method comprises a step E5 that, as already introduced hereinabove, implements a calculation module to calculate, for each of said studied numbers or for each of said numbers identified as suspect at the end of step E4, a revenue amount generated (or liable to be generated) for the benefit of the telephone operator on said portion of study period or, at least, one note or one indicator representative of such a revenue amount.

Typically, said revenues generated for the benefit of the telephone operator may be:
retail revenues that the telephone operator is liable to collect by charging its own customers for the telephone communications emitted (and sometimes for certain telephone communications received) by these latter; and/or
wholesale costs that the telephone operator is liable to collect by charging third-party operators for at least one of its telephone services in the context of roaming agreements (Roaming inter-operator tariff ("IOT") agreements) and/or interconnection agreements (interconnection, termination or carrier inter-operator tariff agreements).

Indeed, the telephone communications emitted by a telephone number of a customer of the telephone operator are liable to generate retail revenues for the latter. Moreover, telephone communications received by a telephone number of a customer of the operator are liable to generate wholesale revenues for the benefit of the latter, in particular when these communications have been emitted by a customer of a third-party telephone operator (charging of interconnection fees for the termination). Furthermore, some telephone communications emitted or received by a telephone number of a customer of a third-party telephone operator are liable to generate wholesale revenues for the telephone operator, in the case in particular of telephone communications emitted or received in roaming situation on a telephone network of said telephone operator.

Thus, step E5 may advantageously comprise an operation of calculating, by said calculation module, a detail revenue amount from retail charging data coming from real invoices established by said telephone operator. For that purpose, the detection method can then comprise an operation of collecting real retail charging data, corresponding to the considered portion of study period, and associated with those of said studied numbers or suspect numbers that are actually managed by the telephone operator, that is to say those which are used by the customers of the latter. Such an operation of collecting retail charging data can be made for example using a second collection module, which may be configured to remotely read, extract and collect real retail charging data contained for example in one or several databases of the telephone operator, after the establishment of a remote computer connection with said database(s). As an alternative, said second collection module could be configured to remotely collect real invoices in electronic format containing said real retail charging data, then to extract from these invoices the single relevant real retail charging data, for example using a parsing method. Said invoices could be memorized in one or several databases of the telephone operator, and thus be collected, imported, by the second collection module after establishment of a remote computer connection with said database(s).

As an alternative or a complement, step E5 can comprises an operation of revaluing telephone communications among said plurality of telephone communications, by a second revaluation module, on the basis of pre-established rules for retail revenue and/or wholesale revenue revaluation. As such, the second revaluation module can be connected, for example, on the one hand to at least one database in which are memorized said pre-established rules for retail revenue and/or wholesale cost revaluation and, on the other hand, to the database in which are advantageously memorized said individually sheets.

Such a telephone communication revaluation on the basis of pre-established retail revenue revaluation rules can advantageously constitute an alternative or a complement to the above-described operation of calculating a retail revenue amount from retail charging data coming from real invoices established by said telephone operator, in the case in particular where all or part of said real retail charging data would not be available. Said pre-established retail revenue revaluation rules can be based on real retail tariffs, in accordance with a retail tariff plan collected from the telephone operator and/or publicly available, and/or wholly or in part on estimated retail tariffs.

As regards the wholesale revenues, the pre-established wholesale revenue revaluation rules are advantageously based wholly or in part, and even preferably exclusively, on estimated wholesale tariffs. Indeed, taking into account in particular the multiplicity of wholesale tariff agreements possibly applicable (and thus the different tariff documents and/or databases that should be taken into consideration), their high variability over time, and their often highly confidential nature, it may sometimes be tricky to construct and apply wholesale revenue revaluation rules that are exclusively based on real wholesale tariffs. Therefore, the implementation of estimations for constructing pre-established wholesale revenue revaluation rules makes it possible to make the method more reliable, more simple and to accelerate the implementation thereof. Still more advantageously, said pre-established wholesale revenue revaluation rules are based wholly or in part on estimated wholesale tariffs, and to which is applied a downrating safety coefficient, in such a way that the so-calculated wholesale revenue amount the telephone operator benefits over said portion of study period is voluntarily underestimated.

At the end of step E5, a (retail and/or wholesale) revenue amount (or a score or amount indicator) is thus allocated to each of said studied numbers, or only to each of the numbers identified as suspect at the end of step E4. Advantageously, said calculation module can be configured to calculate during step E5 a revenue amount for each telephone communication analysed, then to calculate a total amount of revenues generated for the benefit of the telephone operator by summing the revenues calculated for each telephone communication. Possibly, said revenue amount (or score or amount indicator) can then be reported in the corresponding individual sheet. It is also possible to provide that, in addition to said total revenue amount so calculated, the revenues calculated for each of the concerned telephone communications are also reported in the corresponding individual sheet.

As introduced hereinabove, said step E5 is followed, in the case of variants B and C of the method according to the invention, by a step E6 of identifying, by a second identification module, studied numbers or suspect numbers (or at least of at least one studied/suspect number) for which, over said portion of study period, said wholesale cost amount obtained at the end of step E3 is higher than said (retail and/or wholesale) revenue amount calculated during step E5. The numbers so identified at the end of step E6 thus constitute numbers that are also said suspect. Advantageously, said second identification module is as such configured to automatically compare, for each of said studied numbers or suspect numbers, the wholesale cost amounts (or score or amount indicator) obtained at the end of step E3, with the revenue amount (or score or amount indicator) calculated during step E5.

To reduce a potential risk of false-positive detection during step E7, it can be advantageous to provide that step E6 is more specifically a step of identifying studied numbers or suspect numbers (or at least of at least one studied/suspect number) for which, over said portion of study period, said wholesale cost amount is higher than said revenue amount by a value that exceeds a second predetermined threshold value. Advantageously, said second identification module can then be as such configured to automatically compare, for each of said studied numbers or suspect numbers, a difference between the revenue amount and the wholesale cost amount, on the one hand, and said second predetermined threshold value, on the other hand.

Said second predetermined threshold value is advantageously defined as being representative of an individual "gross margin" amount (or a value of a score or an indicator representative of an individual "gross margin" amount) that the telephone operator estimates being able to obtain, in connection with the telephone service(s) provided, over said portion of study period.

The individual sheets that correspond to numbers so identified as suspect at the end of step E6 can then, for example, be extracted and memorized in a database of suspect individual sheets, or be allocated with a particular identifier or marker.

In order to further improve the efficiency of the detection method, the latter can advantageously comprise, at the end of step E4 and/or step E6 (according to the chosen variant A, B or C), and advantageously before step E7:

an operation of modifying said pre-established wholesale cost revaluation rules, then at least one new iteration of said steps E3 and E4, and/or of said steps E3 and E6, on the basis of so-modified wholesale cost revaluation rules.

The implementation of such an additional technical characteristic may be particularly relevant in the case where, in particular, as contemplated hereinabove, said pre-established wholesale cost revaluation rules are based wholly or in part (or even exclusively) on estimated wholesale tariffs, with possible application of an uprating safety coefficient. Indeed, it could happen that, depending on the degree of precision of the estimates retained, an abnormally low or, on the contrary, an abnormally high number of telephone numbers are identified, without this being directly linked to the existence of fraud or abuse. Just as the initial wholesale cost revaluation rules, said modified wholesale cost revaluation rules can themselves be based wholly or in part on estimated wholesale tariffs.

As a complement or an alternative, and still with a view to improving the effectiveness of detection, the detection method can advantageously comprise, at the end of step E4, and advantageously before step E7:

an operation of modifying said first predetermined threshold value, then at least one new iteration of step E4, on the basis of said so-modified first predetermined threshold value.

Symmetrically, in the case of variants B and C of the detection method according to the invention, the latter can advantageously comprise, at the end of step E6, and advantageously before step E7:

- an operation of modifying said pre-established retail revenue and/or wholesale revenue revaluation rules, then
- at least one new iteration of said steps E5 and E6, on the basis of so-modified predefined retail revenue and/or wholesale revenue revaluation rules.

The implementation of such an additional technical characteristic may be particularly relevant in the case where, in particular, as contemplated hereinabove, said pre-established retail revenue and/or wholesale revenue revaluation rules are based wholly or in part (or even exclusively) on estimated retail tariffs and/or wholesale tariffs, with possible application of a downrating safety coefficient. Indeed, it could happen that, depending on the degree of precision of the estimates retained, an abnormally low or, on the contrary, an abnormally high number of telephone numbers are identified at the end of step E6, without this being directly linked to the existence of fraud or abuse. Just as the initial retail revenue and/or wholesale revenue revaluation rules, the modified retail revenue and/or wholesale revenue revaluation rules can themselves be based wholly or in part on estimated retail tariffs and/or wholesale tariffs.

As a complement or an alternative, and still with a view to improving the effectiveness of detection, the detection method can advantageously comprise, at the end of step E4, and advantageously before step E7:

- an operation of modifying said second predetermined threshold value, then
- at least one new iteration of step E6, on the basis of said so-modified second predetermined threshold value.

Moreover, as a complement or an alternative to the above, it is advantageous to provide, for each of the numbers identified as suspect at the end of step E4 or at the end of step E6, a technical operation of validating the corresponding wholesale cost amount obtained at the end of step E3 on the basis of real wholesale tariffs, in the case where the pre-established wholesale cost revaluation rules (modified or not) are based wholly or in part on estimated wholesale tariffs. Such a validation operation may be made by revaluing, for example using the first revaluation module, telephone communications whose transaction data have been collected and compiled in the individual sheets corresponding to said suspect numbers. Therefore, if the use of estimated wholesale tariffs for carrying out step E3 can advantageously allow simplifying and accelerating the implementation of the method when a great number of studied numbers and corresponding individual sheets is concerned, such a later technical operation of validating the wholesale cost amount obtained at the end of step E3, for the numbers identified as suspect at the end of step E4 or at the end of step E6 only (and hence on a limited quantity of studied numbers), helps to make the detection process even more reliable.

As mentioned hereinabove, said given study period may comprise a single period of study period, or preferentially, a plurality of portions of study period, consecutive or not, continuous or discontinuous. Possibly, they may be consecutive portions of study period that are advantageously of same duration. For example, the study period may be of six month and comprise six consecutive portions of study period, of one month each.

In this case, it is in particular advantageously possible to facilitate the implementation of the detection method and to further refine the detection of fraud or abuse by providing that:

- step E4 is more specifically provided for identifying studied numbers called suspect numbers for which, on a plurality of portions of said study period, wherein said wholesale cost amount is higher than said first predetermined threshold value; and/or that
- step E6 is more specifically provided for identifying studied numbers, or numbers already pre-identified as suspect at the end of E4, for which
  - over a plurality of portions of said study period, said wholesale cost amount is higher than said revenue amount, or, as the case may be
  - over a plurality of portions of said study period, said wholesale cost amount is higher than said revenue amount by a value that exceeds a second predetermined threshold value, as contemplated hereabove.

Of course, steps E3 and/or E5 (according to the retained variant A, B or C) will then be adapted as a consequence in such a way as to allow a wholesale cost revaluation and/or a (retail and/or wholesale) revenue calculation over each of the portions of such a plurality of portions of study period.

Such an approach over a plurality of portions of study period thus advantageously amounts to focus on the chronic, repetitive nature of the detected anomaly(ies), that further increases the probability of existence of fraud or abuse, associated with a given telephone number. Step E7 can then be advantageously carried out after the preceding steps have been carried out over the whole given study period, that is to say in such a way as to cover all the portions of said plurality of study period portions.

Once telephone numbers identified as suspect at the end of step E4 and/or step D6 (according to the retained variant A, B or C) by detection of an economic anomaly in wholesale costs and/or "gross margin", said suspect numbers and their corresponding individual sheets are then subjected to step E7 of the detection method.

As introduced hereinabove, said step E7 has for object the detection of at least one fraudulent or abusive use of at least one telephone service provided by the telephone operator by analysis of transaction data that have been compiled, during step E2, in said individual sheets associated with those among said studied numbers that have been identified as suspect at the end of step E4 and/or step E6. As a complement or an alternative, the detection of at least one fraudulent or abusive use of at least one telephone service provided by the telephone operator by analysis of multiparametric indicators constructed from transaction data that have been compiled, during step E2, in said individual sheets associated with studied numbers that have been identified as suspect at the end of step E4 and/or step E6.

As such, the method can then advantageously comprise an operation of constructing multiparametric indicators, for each of said individual sheets, on the basis of predefined construction rules. Such multiparametric indicators can advantageously be constructed during, or simultaneously to, step E2 of constructing individual sheets. Possibly, said multiparametric indicators can be constructed for study sub-periods of lower duration than the respective duration of the portion(s) of study period (for example, per day or also par week). Advantageously, said so-constructed multiparametric indicators can be memorized in said individual sheets.

By way of non-limitative example, such multiparametric indicators can be defined in such a way as to describe, over one or several portions of the given study period or over a particular relevant sub-period of said study period:
- a number of different countries visited in roaming situation;
- a number consecutive days in roaming situation;
- a time frequency of emission and/or reception of telephone communications in a given format;
- a number of different IMEI numbers used for a same telephone number;
- a number of telephone communications in the SMS/SMS+/MMS/MMS+ format(s) emitted towards one or several particular countries of destination (and in particular towards one or several particularly costly countries of destination), etc.

Particularly advantageously, all or part of said multiparametric indicators can be multiparametric indicators revalued in terms of wholesale costs (interconnection costs and/or "IOT" costs), that is to say multiparametric indicators for which a corresponding wholesale cost (real or estimated) has been calculated. Such a revaluation can be advantageously made during, or simultaneously to, revaluation step E3. It may advantageously be implemented using the first revaluation module, and on the basis of said pre-established wholesale cost revaluation rules. Step E3 of the method can hence advantageously comprise a technical operation of revaluing multiparametric indicators constructed during step E2, on the basis of said pre-established wholesale cost revaluation rules, to obtain for all or part of said multiparametric indicators a wholesale cost amount (interconnection costs and/or "IOT" costs) incurred by the telephone operator over one or several portions of the given study period or over a particular relevant sub-period of said given study period.

Following the same logic, all or part of said multiparametric indicators can be multiparametric indicators revalued in terms of (wholesale and/or retail) revenues.

For reasons similar to those already exposed hereinabove, the construction then the analysis, during step E7, of such revalued multiparametric indicators, which thus advantageously combine particular technical characteristics and an economic characteristic (costs and/or revenues) of telephone communications, makes it possible to further improve the efficiency of fraud or abuse detection.

Preferentially, step E7 comprises an operation of statistic grouping and/or classification by profiles of the numbers identified at the end of step E4 and/or step E6. Such an operation of statistic grouping and/or classification can be advantageously carried out using a statistic grouping and/or classification module, which implements for example one or several classifier(s). Step E7 can then advantageously comprise an operation of matching said profiles with at least one predefined recognized fraudulent or abusive pattern, in such a way as to confirm a fraudulent or abusive nature of said profiles. Defined previously to the carrying out of step E7, the predefined recognized fraudulent or abusive pattern(s) can be typically memorized in a database of known abusive or fraudulent pattern(s), said database can then be interrogated during said matching operation.

As an alternative or a complement, step E7 can advantageously comprise an operation of defining one or several new fraudulent or abusive pattern(s), in the case in particular where one or several of said profiles do no correspond to any predefined recognized abusive or fraudulent pattern. In this case, the method according to the invention could advantageously comprise an operation of memorizing said new fraudulent or abusive pattern(s) in a database, which can then advantageously be the above-mentioned database of known abusive or fraudulent patterns. Therefore, this or these new fraudulent or abusive pattern(s) can then be used during a future new iteration of step E7, and in particular of the matching operation described hereinabove.

Advantageously, said method can comprise, at the end of said step E7, an operation of generating an alert, by an alert generation module, relating to the detection of at least one abusive or fraudulent use of at least one telephone service provided by the telephone operator. Preferentially automated, said alert generation operation can thus advantageously comprise the elaboration and the emission of an alert report or electronic message (for example, an e-mail), containing at least one telephone number identified at the end of step E7 as having been involved (or at least as being very strongly suspected to have been involved) in a fraudulent or abusive use of at least one of said telephone services of the telephone operator. Possibly, the individual sheet associated with said telephone number may be included into said alert report or electronic message, in view of a possible further analysis operation. As an alternative, the generated alert may take the form, for example, of particular information fed back and displayed on a computerized dashboard.

As an alternative or a complement, said method may advantageously comprise at the end of said step E7, and for example after reception of an alert generated during an alert generation operation as contemplated hereinabove:
- an operation of disconnecting (temporary or definitely) a telephone number and/or deactivating a SIM card associated with a telephone number, for which a fraudulent or abusive use of at least one of said telephone services of the telephone operator has been detected at the end of step E7, and/or
- an operation of modifying at least one operating parameter of a telephone service of said telephone operator, an abusive or fraudulent use of which by at least one telephone number has been detected at the end of step E7.

For example and in a non-limiting manner, such an operating parameter can be:
- a maximum allowed volume of minutes of communication in Voice format, per call or per reference period (for example, per month in the case of a monthly telephone subscription), and/or for one or several countries or geographic areas of outgoing and/or incoming calls;
- a maximum volume of communications in the SMS/SMS+/MMS/MMS format(s), per reference period, and/or for one or several countries or geographic areas of outgoing and/or incoming calls;
- a maximum volume of data downloaded and/or uploaded in the context of telephone communications in Data format per reference period;
- a maximum downstream or upstream rate of data liable to be downloaded or uploaded in the context of telephone communications in Data format during a reference period, etc.

Such a modification of operating parameter(s) can relate indifferently any telephone number using the concerned telephone service of the telephone operator, or, on the contrary, concern only one or several telephone number(s) for which a fraudulent or abusive use of said concerned telephone service has been detected at the end of E7.

POSSIBILITY OF INDUSTRIAL APPLICATION

The invention finds its application in the field of methods for detecting fraudulent or abusive use of telephone services provided by a telephone operator, and that in the particular case of telephone communications involving a roaming and/or telephone network interconnection situation.

The invention claimed is:

1. A method for detecting fraudulent or abusive use of at least one telephone service provided by a telephone operator, said method comprising the following successive steps:
    a step E1 of collecting transaction data relating to a plurality of telephone communications made, over at least one portion of a given study period, from or towards telephone numbers, called the studied numbers, said plurality of telephone communications comprising at least telephone communications that involve a roaming and/or interconnection situation;
    a step E2 of computer processing of said transaction data and constructing, for each studied number, an individual sheet compiling collected transaction data that correspond to said number studied over said portion of a study period;
    a step E3 of revaluing telephone communications among said plurality of telephone communications, by a first revaluation module, on the basis of pre-established wholesale cost revaluation rules, to obtain for each of said studied numbers a wholesale cost amount incurred by the telephone operator over said portion of study period;
said method then comprising:
    a step E4 of identifying studied numbers called suspect numbers for which, over said portion of study period, said wholesale cost amount is higher than a first predetermined threshold value;
and/or
    a step E5 of calculating for each of said studied numbers or said suspect numbers, a revenue amount generated for the benefit of the telephone operator over said portion of study period, said step E5 being followed by a step E6 of identifying studied numbers or suspect numbers for which, over said portion of study period, said wholesale cost amount being higher than said revenue amount;
said method comprising, after step E4 or after step E6, a step E7 of detecting a fraudulent or abusive use by analysing transaction data compiled in said individual sheets associated with said identified numbers and/or multiparametric indicators constructed from transaction data compiled in said individual sheets associated with said identified numbers.

2. The method according to claim 1, wherein said transaction data are contained in call detailed recording files, called Call Detail Record (CDR) and/or Event Detail Record (EDR) files, and/or in transaction files relating to a roaming situation in Transfer Account Procedure (TAP) format.

3. The method according to claim 1, wherein the transaction data intended to be compiled in said individual sheets during step E2 are related to telephone communications in Voice format, SMS and/or SMS+ and/or MMS and/or MMS+ format(s), and/or Data format.

4. The method according to claim 1, wherein the transaction data intended to be compiled in said individual sheets during step E2 are transaction data relating to only telephone communications involving a roaming and/or interconnection situation.

5. The method according to claim 4, wherein the transaction data intended to be compiled in said individual sheets during step E2 are transaction data relating to only telephone communications involving an international roaming and/or international interconnection situation.

6. The method according to claim 1, wherein said pre-established wholesale cost revaluation rules are based wholly or in part on estimated wholesale tariffs.

7. The method according to claim 1, which comprises, at the end of step E4 and/or step E6, an operation of modifying said pre-established wholesale cost revaluation rules, then at least one new iteration of said steps E3 and E4, or said steps E3 and E6.

8. The method according to claim 1, which comprises, at the end of step E4, an operation of modifying said first predetermined threshold value, then at least one new iteration of step E4.

9. The method according to claim 1, wherein step E6 is a step of identifying studied numbers or suspect numbers for which, over said portion of study period, said wholesale cost amount is higher than said revenue amount by a value that exceeds a second predetermined threshold value.

10. The method according to claim 9, which comprises, at the end of step E6, an operation of modifying said second predetermined threshold value, then at least one new iteration of step E6.

11. The method according to claim 1, wherein step E5 comprises an operation of revaluing telephone communications among said plurality of telephone communications on the basis of pre-established wholesale cost revaluation rules.

12. The method according to claim 11, which comprises, at the end of step E6, an operation of modifying said pre-established retail revenue and/or wholesale revenue revaluing rules, then at least one iteration of said steps E5 and E6.

13. The method according to claim 1, wherein said pre-established revaluation rules are based wholly or in part on estimated retail tariffs and/or estimated wholesale tariffs.

14. The method according to claim 1, wherein step E5 comprises an operation of calculating, by said calculation module, a detail revenue amount from retail charging data coming from real invoices established by said telephone operator.

15. The method according to claim 1, wherein said step E7 comprises:
    an operation of statistic grouping and/or classification by profiles of the numbers identified at the end of step E4 and/or step E6, and
    an operation of matching said profiles with at least one predefined recognized abusive or fraudulent pattern or an operation of defining a new abusive or fraudulent pattern.

16. The method according to claim 1, which comprises, at the end of said step E7, an operation of generating an alert relating to the detection of an abusive or fraudulent use.

17. The method according to claim 1, which comprises:
    an operation of disconnecting a telephone number or deactivating a SIM card associated with a telephone number, for which a fraudulent or abusive use of at least one of said telephone services of the telephone operator has been detected at the end of step E7; and/or
    an operation of modifying at least one operating parameter of a telephone service of said telephone operator, an abusive or fraudulent use of which by at least one telephone number has been detected at the end of step E7.

* * * * *